US010755578B2

(12) United States Patent
Van Hoecke et al.

(10) Patent No.: US 10,755,578 B2
(45) Date of Patent: Aug. 25, 2020

(54) METHOD AND APPARATUS FOR RIDE-SHARE PLANNING USING SPATIAL AWARENESS

(71) Applicant: FORD GLOBAL TECHNOLOGIES, LLC, Dearborn, MI (US)

(72) Inventors: Patrick Lawrence Jackson Van Hoecke, Dearborn, MI (US); Anthony Melatti, Dearborn, MI (US); Hamid Golgiri, Dearborn, MI (US); Danielle Rosenblatt, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 15/876,915

(22) Filed: Jan. 22, 2018

(65) Prior Publication Data

US 2019/0228662 A1    Jul. 25, 2019

(51) Int. Cl.
| | |
|---|---|
| *G08G 1/00* | (2006.01) |
| *G01C 21/34* | (2006.01) |
| *H04W 4/40* | (2018.01) |
| *G06Q 50/30* | (2012.01) |
| *B60R 21/015* | (2006.01) |
| *H04W 4/02* | (2018.01) |
| *H04W 4/44* | (2018.01) |
| *B60R 16/023* | (2006.01) |
| *H04L 29/08* | (2006.01) |

(52) U.S. Cl.
CPC ....... *G08G 1/202* (2013.01); *B60R 21/01512* (2014.10); *G01C 21/3438* (2013.01); *G06Q 50/30* (2013.01); *H04W 4/40* (2018.02); *H04W 4/02* (2013.01)

(58) Field of Classification Search
CPC ..... G08G 1/202; G01C 21/3438; H04W 4/40; H04W 4/02; H04W 4/44; G06Q 50/30; B60R 21/01512; B60R 16/0213; H04L 67/12
USPC ........................................................ 701/408
See application file for complete search history.

(56) References Cited

U.S. PATENT DOCUMENTS

| | | | |
|---|---|---|---|
| 9,229,905 B1* | 1/2016 | Penilla | G06F 17/00 |
| 9,488,982 B2 | 11/2016 | Gurin | |
| 2010/0036560 A1* | 2/2010 | Wright | B60R 16/037 |
| | | | 701/36 |
| 2011/0145089 A1* | 6/2011 | Khunger | G01C 21/3438 |
| | | | 705/26.4 |
| 2011/0301997 A1* | 12/2011 | Gale | G06Q 10/06316 |
| | | | 705/7.26 |
| 2014/0272486 A1* | 9/2014 | Kobayashi | H01M 10/399 |
| | | | 429/52 |

(Continued)

*Primary Examiner* — Marthe Y Marc-Coleman
(74) *Attorney, Agent, or Firm* — Michael Spenner; Brooks Kushman P.C.

(57) ABSTRACT

A system includes a processor configured to receive a vehicle request, including a requesting-occupant physical parameter. The processor is also configured to send a request, including the physical parameter, to a vehicle-hailing service. The processor is further configured to receive identification of a vehicle having sufficient space to accommodate the requesting-occupant, based on the physical parameter, responsive to the request. Also, the processor is configured to receive confirmation of the vehicle from the requesting-occupant, and request use of the vehicle, responsive to the confirmation.

19 Claims, 4 Drawing Sheets

(56) References Cited

U.S. PATENT DOCUMENTS

| | | | |
|---|---|---|---|
| 2014/0309870 A1* | 10/2014 | Ricci | A61B 5/6808 |
| | | | 701/36 |
| 2015/0072400 A1* | 3/2015 | Clarke | C12M 21/02 |
| | | | 435/257.1 |
| 2016/0101783 A1 | 4/2016 | Abou-Nasir et al. | |
| 2016/0320194 A1* | 11/2016 | Liu | G01C 21/3438 |
| 2016/0320195 A1* | 11/2016 | Liu | G06Q 50/01 |
| 2016/0368509 A1 | 12/2016 | Uppal | |
| 2017/0151918 A1* | 6/2017 | Boesen | A61B 5/117 |
| 2017/0282753 A1* | 10/2017 | Zouzal | B60N 2/995 |
| 2018/0039917 A1* | 2/2018 | Buttolo | G01C 21/3438 |
| 2018/0350024 A1* | 12/2018 | Kaufman | G06Q 50/30 |
| 2018/0357907 A1* | 12/2018 | Reiley | H04W 4/023 |
| 2019/0077346 A1* | 3/2019 | Pankow | B60R 16/037 |
| 2019/0137290 A1* | 5/2019 | Levy | G05D 1/0214 |
| 2019/0171988 A1* | 6/2019 | Kwatra | G06Q 10/06314 |
| 2019/0176837 A1* | 6/2019 | Williams | B60W 40/08 |

* cited by examiner

METHOD AND APPARATUS FOR RIDE-SHARE PLANNING USING SPATIAL AWARENESS

TECHNICAL FIELD

The illustrative embodiments generally relate to methods and apparatuses for ride sharing planning using spatial awareness.

BACKGROUND

People come in all shapes and sizes, and this can occasionally create difficulty in shared seating situations, such as on busses, trains and airplanes. With increased usage of ride-sharing concepts, such as shared, hailed vehicles, this can create potential new problems in a much more cramped space, as most vehicle interiors are far less spacious than mass-transportation options. Also, seats are not always as clearly delineated as they are on planes, for example, and so two or three people attempting to share a ride, who may all require significant space, may find themselves in an uncomfortable or even impossible situation. This can lead to awkwardness and lost fares for a driver, and generally may discourage certain people from even attempting to use any service other than hailed, unshared rides. Even in those situations, if a six foot ten inch person hails a vehicle, and the driver is driving a two door compact, uncomfortableness and/or impossibility may result.

Most vehicle seats can be adjusted in some manner, and in the future autonomous vehicles may include much more dynamically reconfigurable seating. But even if a seat can be adjusted, there is currently little to no accommodation to address the potential pitfalls of tall or otherwise large occupants attempting to share an already partially-occupied ride.

SUMMARY

In a first illustrative embodiment, a system includes a processor configured to receive a vehicle request, including a requesting-occupant physical parameter. The processor is also configured to send a request, including the physical parameter, to a vehicle-hailing service. The processor is further configured to receive identification of a vehicle having sufficient space to accommodate the requesting-occupant, based on the physical parameter, responsive to the request. Also, the processor is configured to receive confirmation of the vehicle from the requesting-occupant; and request use of the vehicle, responsive to the confirmation.

In a second illustrative embodiment, a system includes a processor configured to receive a vehicle request, including a requesting-occupant physical parameter. The processor is also configured to determine a vehicle having available occupancy sufficient to accommodate the requesting-occupant, based on the physical parameter and respond to the request by identifying the determined vehicle as an available vehicle.

In a third illustrative embodiment, a system includes a processor configured to determine that a vehicle is preparing to obtain a passenger that requested the vehicle as a hailed-ride. The processor is also configured to determine a seat pre-designated for occupant occupancy and provide a vehicle-interior visual guide identifying the determined seat.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
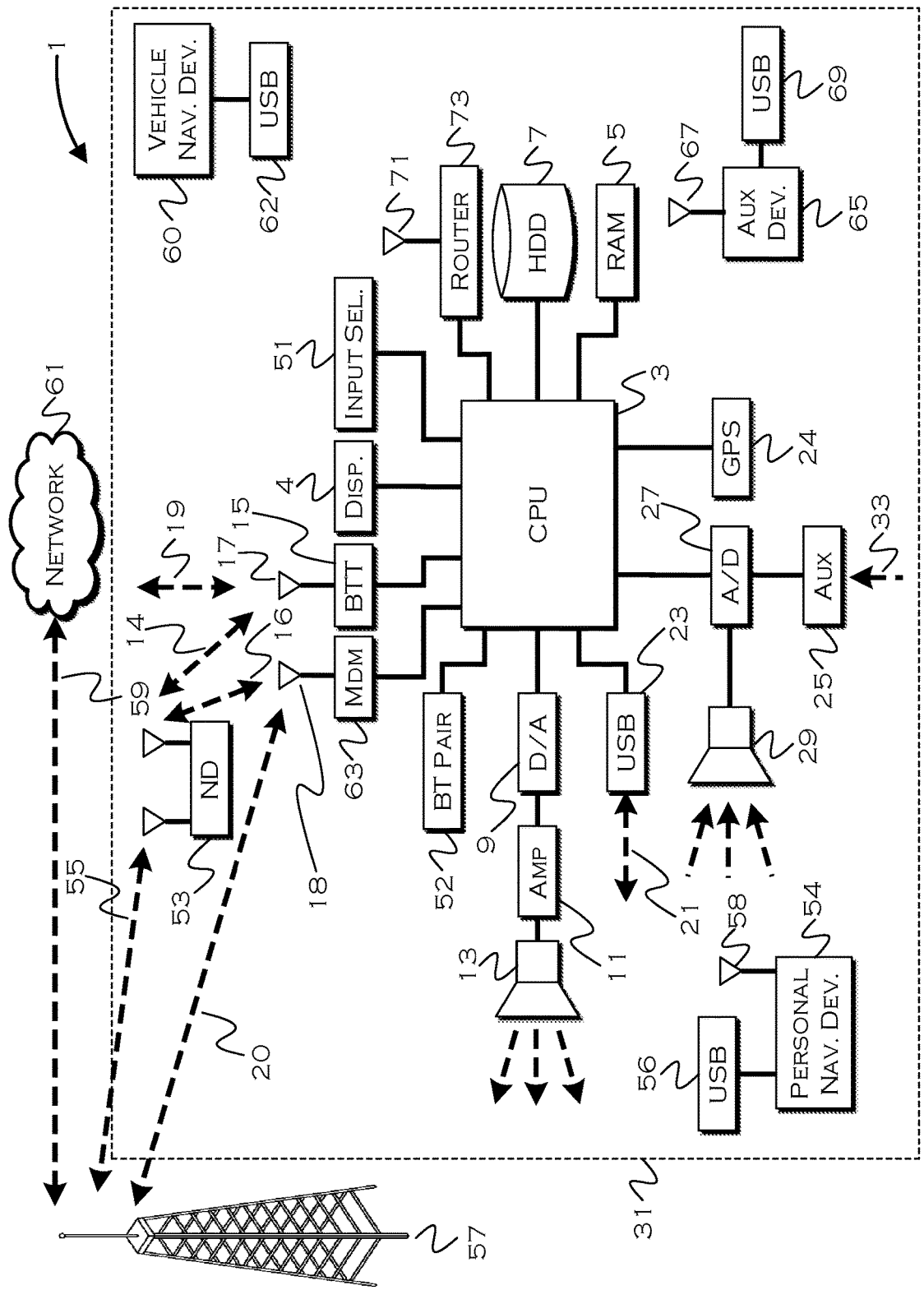
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Autonomous vehicles, which do not necessarily need driving controls or even forward facing seats, may include significantly reconfigurable vehicle seating which could resemble a small living room in some configurations. Whether the seating faces forwards, inwards or otherwise, the seating may be somewhat modular, stowable, mobile and/or reconfigurable within the space of a cabin interior.

At the same time, advanced user profiles are already capable of measuring and storing physical personal preferences and parameters. Retrieval and use of these characteristics, as well as characteristic gathering, are discussed in co-owned and co-pending application U.S. Ser. No. 15/015,559 which is fully incorporated herein by reference.

As automated ride-hailing opportunities increase and become more popular, people may become more comfortable sharing rides with strangers. In certain instances, this may be the only available option if service vehicles are limited. Also, when vehicles become more commonly autonomous (AV), use of vehicles may be subscription based, and certain lower priced options may require sharing of rides. In order to fully utilize vehicles and not lose an entire class of possible customers, it would be useful for these vehicles to be capable of being scheduled and/or reconfigured to accommodate the expected varied sizes of users. Thus, the illustrative embodiments provide a spatial awareness aspect to ride-hailing and AV utilization scenarios.

Figure 2:
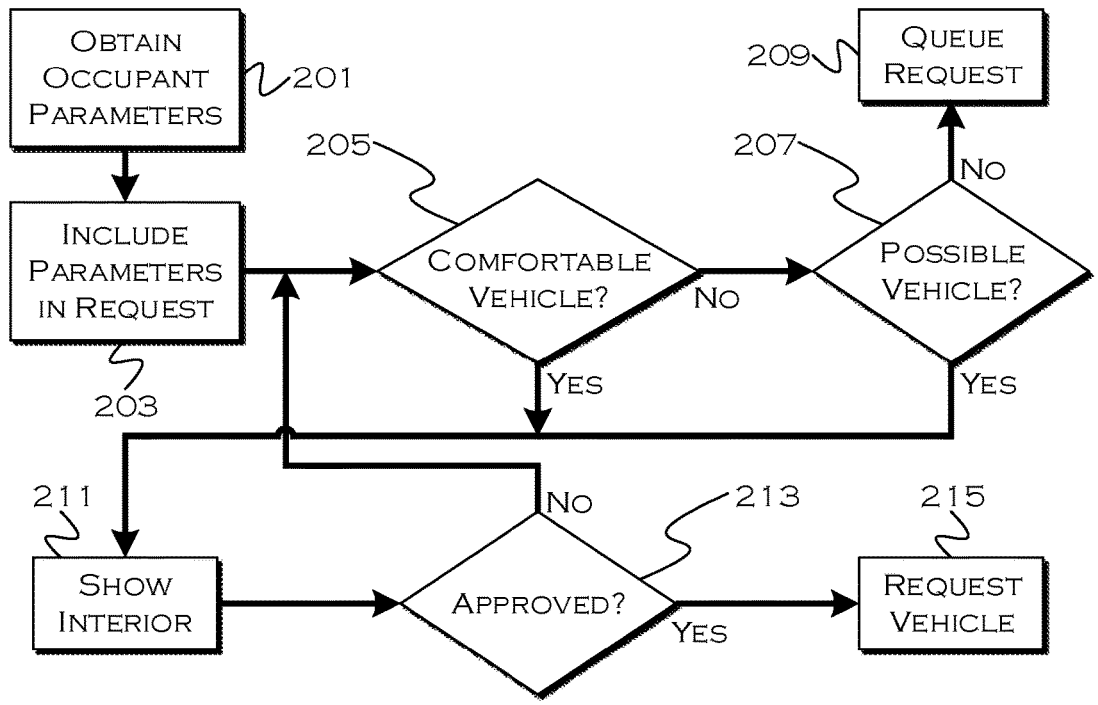
FIG. 2 shows an illustrative process for ride-hailing with spatial awareness.

FIG. 2 shows an illustrative process for ride-hailing with spatial awareness. This process would run on a user's mobile device, for example, and allow the user to observe and select possible seating configuration options from a variety of available vehicles. The user might also be able to specify whether space or immediacy was a priority, because a user might be willing to be temporarily uncomfortable for all or part of a journey in order to obtain a ride more quickly.

In this illustrative example, the process uses 201 a user profile, which may be included on a device or accessed from a remote account, to include 203 user physical preferences, parameters and constraints in a request for a vehicle. By transferring the parameters to a planning process, the planning process can utilize the specified parameters to best manage both user preferences for an individual user and available vehicle space to maximize or optimize traveler servicing.

If a request returns an indicator of a comfortable 205 or possible 207 vehicle, the local process could show the user a wireframe, image or even 3D model of the vehicle interior demonstrating current occupancy and where the user would sit. The model could even approximate the available space for the user inside the vehicle, in terms of likely leg and elbow room, for example. The "comfortable" vehicle may be a vehicle that will fully accommodate any user physical parameters and preferences, and the "possible" vehicle may be a vehicle that would be usable, but possible uncomfortable.

If there is neither a comfortable or even a possible current vehicle, the process may queue 209 the request for future fulfilment, allowing users to wait for a "better" option if only an uncomfortable option exists, for example. If the user approves 213 the possible vehicle, the process may send a request to a specific vehicle approved by the user.

Many current ride-hailing systems rely on users being willing to use certain classes of vehicles, but do not specify individual vehicles specifically for certain users, unless those are the only vehicles in an area. These models could be adapted to accommodate the spatial awareness models and/or user acceptance models, whereby a driver has to agree to a fare and the user has to approve the vehicle. In AV models, where there is no driver to agree to the fare, one of the variables is removed, and certain models can also present "take it or leave it" formats, where comfortable vehicles or possible vehicles are "automatically" accepted based on meeting certain occupant parameter minimum constraints (e.g., if an occupant is four feet three inches tall, that person must take offered vehicles that can accommodate them, as opposed to waiting for a half empty large sport utility vehicle).

Figure 3:
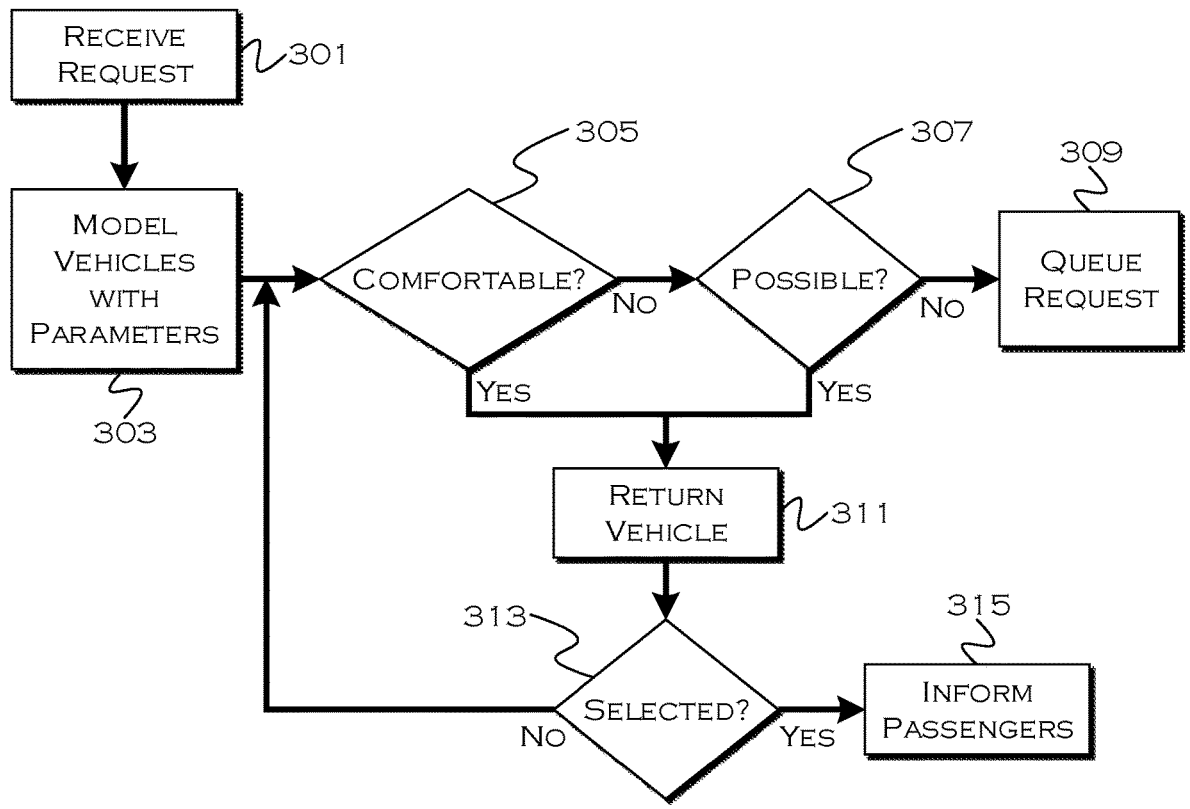
FIG. 3 shows an illustrative ride-option selection process with spatial awareness.

FIG. 3 shows an illustrative ride-option selection process with spatial awareness. In this example, the process runs on a scheduling server (or servers) or other centralized system capable of receiving and evaluating both rider parameters and vehicle parameters. In some examples, the central server could merely receive and broadcast available parameters for each vehicle, allowing individual devices to decide if a given vehicle were appropriate.

In this process, the centralized system receives a request for a vehicle, which, in this example, also include parameters for one or more intended occupants. If the vehicle is being requested on behalf of multiple occupants, the requesting process may require the user to specify the number of occupants. The user could also specify profile identifiers allowing the application to recall the profiles from a server or through communication with individual devices storing profiles of intended riders.

The central scheduling process may keep track of current vehicle occupant configurations and/or intended occupant configurations (for dispatched vehicles not yet fully occupied). The system can thus remain aware of available empty space and/or seating reconfiguration options, and when occupant parameters are received, the system can model 303 possible open vehicles within an appropriate locality and having sufficient space. If a seating change and/or a seat reconfiguration is needed to accommodate a passenger, the system may also send a request for a passenger to change a seat (when it is safe to do so), and/or may send a request for a seating reconfiguration (which may require evacuation of a vehicle, depending on the form of reconfiguration).

If the process is able to locate a "comfortable" 305 and/or "possible" 307 vehicle or group of vehicles, the process may return 311 the identified vehicles, along with any parameters needed if the local device is going to perform visual modeling. If the process performs the modeling or image presentation (so the user can see the proposed configuration), the process may return the completed model and/or image. If one of the proposed vehicles is selected 313, the process may inform 315 current passengers of any movements or changes needed to accommodate the new passengers. If no vehicles remain that are selected or selectable, the process may queue 309 the request for later handling.

Figure 4:
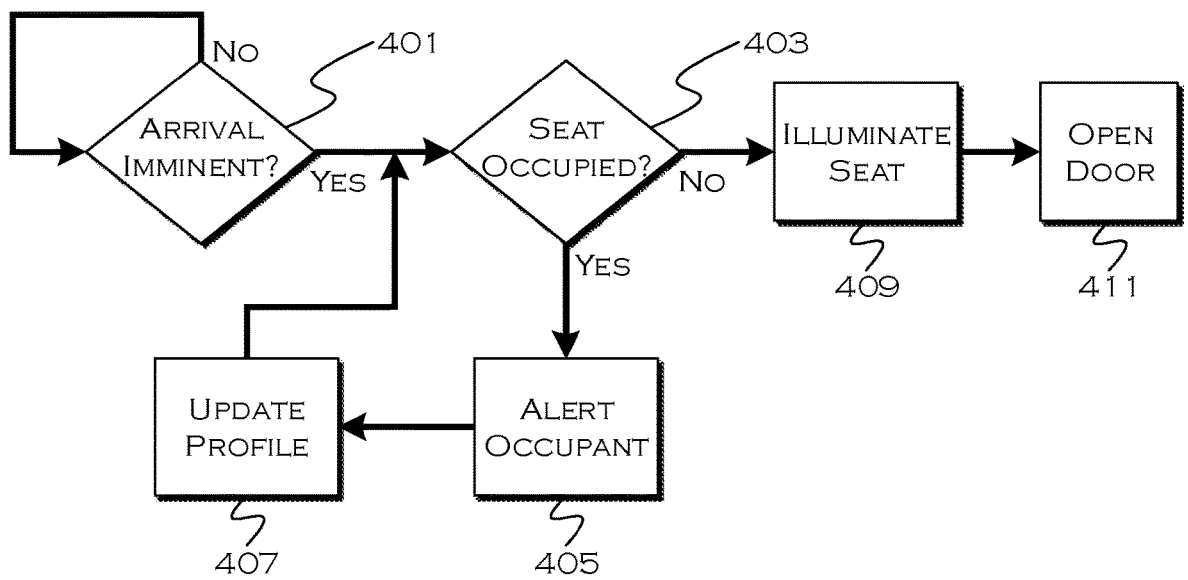
FIG. 4 shows an illustrative seating assistance process.

FIG. 4 shows an illustrative seating assistance process. In this example, the process will reconfigure and/or guide a particular user to a seat. In this example, the process uses illumination to guide a user to a given seat, and could use multiple colors, for example, to guide multiple occupants to seats (e.g., presenting a different color on each occupant device or next to occupant names on a single device, indicating intended seating. If reconfiguration is needed, the process may request evacuation of a vehicle or movement of a passenger to accommodate the reconfiguration.

In this example, the process determines 401 if arrival at a new occupant is imminent. If there is an imminent arrival, the process may also determine 403 if a seat intended for the new occupant is currently occupied. If the seat is occupied, the process may alert the person currently sitting in the seat that their seat is designated for another person.

Since it may be undesirable to attempt to cause a user to physically leave a seat, if not impossible, the illustrative embodiments utilize a profile update process which could, for example, cause a user rating to diminish if a seat is not surrendered. Lower ratings could lower vehicle availability or even prevent use for a while, depending on implementation. Monetary penalties could also apply, so in this example, after the process alerts 405 the occupant, the process may update 407 a user profile based on whether or not the occupant moves seats as requested. In some instances, a user may be permitted to occupy any seat until movement is requested, so the negative profile update might only occur if the user did not change seats in a timely manner.

If the intended user seat is unoccupied or vacated, the process may illuminate 409 the seat and/or a path to the seat. As noted, varied colored lights can be used for illumination to identify the appropriate seats for individual occupants. One or more occupant devices may correspondingly display the appropriate color as well. Once the destination is reached, the process may also open 411 a door or doors corresponding to intended seating.

Figure 5:
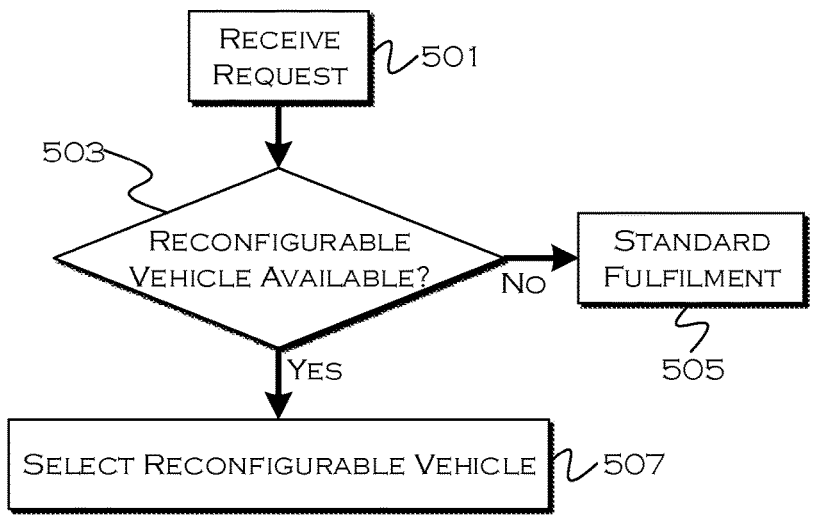
FIG. 5 shows another illustrative ride-selection process.

FIG. 5 shows another illustrative ride-selection process. This process allows for a system to choose between reconfigurable vehicles and standard vehicles. In this example, since standard vehicles have fixed configurations, they may be "preserved" in favor of tasking reconfigurable vehicles first, since the fixed configuration vehicles can necessarily only accommodate certain physical characteristics. Of course, the exact opposite reasoning could be applied and the opposite process could be used as well, depending on chosen implementation.

Here, the process receives 501 a request including a physical characteristic that corresponds to an "atypical" characteristic (based on predefinition). For example, if most vehicles can accommodate a passenger of six feet or less, and a user is six foot five inches, this may be an "atypical" characteristic. In this example, if any reconfigurable vehicle is available 503, the process will select 507 the reconfigurable option and have the vehicle adjust to accommodate the user. Otherwise, the process will find 505 a suitable or usable standard fixed configuration vehicle for use.

In another model, the implementer may decide that it is best to preserve reconfigurable vehicles for worst-case scenarios, and may use all available standard vehicles first before requesting reconfigurable vehicles, which is essentially the opposite model.

Figure 6:
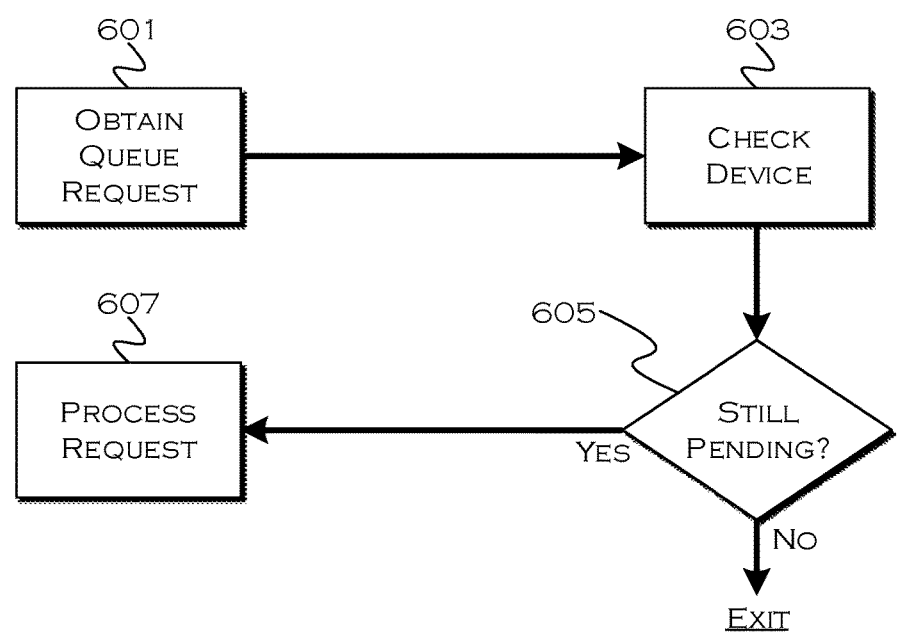
FIG. 6 shows an illustrative ride-request queue-handling process.

FIG. 6 shows an illustrative ride-request queue-handling process. This process occurs when both the centralized process and the local mobile device system queue a request because the request could not be handled (or for other reasons). Since the local user may have cancelled the request, the process obtains a request 601 from a central queue, and attempts to check 603 the local device to ensure the request is still pending 605. Since the local user may have found a different ride or otherwise cancelled the request, but the device may not have notified the remote queue, the process checks that the request is still pending on the mobile device before fulfilling the request. This can help avoid improperly dispatching a vehicle to a party that no longer needs it. If the request is still pending, the system processes 607 the request.

Figure 7:
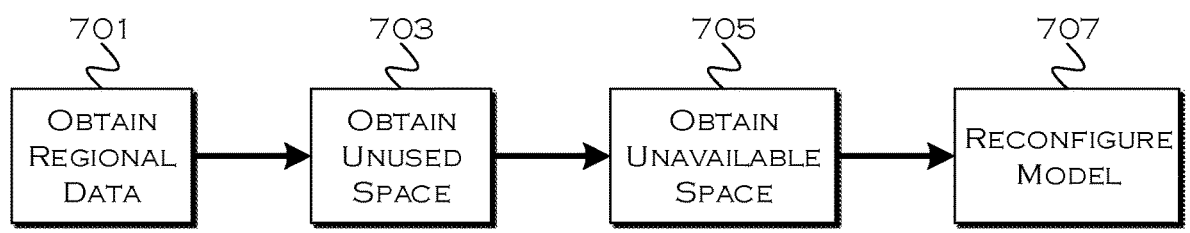
FIG. 7 shows an illustrative driver/vehicle allocation process.

FIG. 7 shows an illustrative driver/vehicle allocation process. This is an illustrative example of how the vehicle spatial awareness accommodation can be used to allocate vehicular resources within various geographic regions. People in certain locales may have physical characteristics that vary from a common populace, and people attending certain events may also have varied physical characteristics. Over time, or using other known demographic data, these characteristics can be better accommodated by allocating vehicles appropriately in expectation of certain passenger types. For example, if a wheel-chair trade show is ongoing and expected to be heavily attended, a larger than normal set of vehicles that can accommodate wheel-chairs may be dispatched to patrol a region around the convention.

Certain sports fans, music fans, food fans and other potential occupants may have observable physical demographic characteristics, and since vehicles can potentially accommodate those characteristics, the system can dispatch not only a sufficient volume of vehicles to service an event or demand, but actually dispatch the appropriately accommodating vehicles as well. This could be as simple as dispatching a large number of multi-passenger vehicles for group-attended events to the specialized vehicles as noted in the previous example.

In this example, the process obtains 701 utilization data corresponding to a certain event, type of event, geographic region, etc. The process, which can track used and unused occupancy space, determines 703 available, unused occupancy for a time period. The process may also obtain metrics on unavailable space, which would be physical user requirements that could not be accommodated, or accommodated immediately, by existing vehicular infrastructure. The gathered data can then be used to reconfigure models for events or regions, so that if the central system manages demand and supply by strategically dispatching vehicles to patrol certain areas, the models should better reflect the short-term or long-term needs of the population.

The illustrative embodiments allow for ride-hailing and AV ride provision with accommodation for requesting-user physical characteristics. This can lead to increased ride-sharing and improved space utilization, as well as opening up sharing opportunities to additional aspects of a populace who may be under-served by existing solutions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:

receive a vehicle request, including a requesting-occupant physical parameter, the request requesting a vehicle-hailing service for sending a vehicle to pickup the requesting-occupant;

responsive to the request, identifying a vehicle from a plurality of vehicles available to service the request, the identification based on comparison of current occupancy of a given vehicle of the plurality of vehicles and known vehicle spatial characteristics of the given vehicle compared to the physical parameter, such that the identified vehicle has sufficient space to accommodate the requesting-occupant in at least one seat that is available or could be made available through passenger movement;

send information identifying the identified vehicle to the requesting-occupant;

receive confirmation of the vehicle from the requesting-occupant; and responsive to the confirmation, instruct the identified vehicle to pick up the requesting-occupant.

2. The system of claim 1, wherein the physical parameter includes an occupant height.

3. The system of claim 1, wherein the physical parameter includes an occupant weight.

4. The system of claim 1, wherein the physical parameter includes an occupant limb-length.

5. The system of claim 1, wherein the processor is configured to send a view of the vehicle interior responsive to receiving identification of the vehicle.

6. The system of claim 5, wherein the view includes other current occupants in locations identified by the received identification of the vehicle.

7. The system of claim 1, wherein the processor is configured to send a view of the vehicle interior including a model of the requesting-occupant, responsive to receiving identification of the vehicle.

8. The system of claim 7, wherein the view is a two-dimensional view.

9. The system of claim 7, wherein the view is a three-dimensional view.

10. A system comprising:
a processor configured to:
receive a vehicle request, including a requesting-occupant physical parameter;

determine a vehicle, from a plurality of vehicles, having available occupancy sufficient to accommodate the requesting-occupant, based on the physical parameter compared to available seating options in each of the plurality of vehicles determined based on current occupancy of each of the plurality of vehicles, the determination further based on vehicle spatial parameters used to determine that at least one seat from occupied and unoccupied seats could accommodate the user physical parameter; and respond to the request by identifying the determined vehicle as an available vehicle.

11. The system of claim 10, wherein the processor is configured to determine the current occupancy of each of the plurality of vehicles based on reports received from a plurality of possible vehicles indicating current occupancy.

12. The system of claim 10, wherein the processor is configured to determine the vehicle based further on reports received from the plurality of vehicles indicating current occupant seating locations.

13. The system of claim 10, wherein the physical parameter includes an occupant height.

14. The system of claim 10, wherein the physical parameter includes an occupant weight.

15. The system of claim 10, wherein the physical parameter includes an occupant limb-length.

16. The system of claim 10, wherein the processor is configured to:
determine that an occupant seating change would allow a possible vehicle to accommodate the requesting-occupant physical characteristic; and
send a request to the possible vehicle, requesting the seating change.

17. The system of claim 16, wherein the request includes a request for an occupant to change seats.

18. The system of claim 16, wherein the request includes a request for the vehicle to reconfigure reconfigurable seats.

19. The system of claim 10, wherein the processor is configured to determine both a first vehicle sufficient to accommodate the physical parameter based on a predefined comfort parameter and a second vehicle sufficient to accommodate the physical parameter based on a predefined possibility parameter, the possibility parameter accommodating a tighter fit of occupants than the comfort parameter.

* * * * *